(12) United States Patent
Marble et al.

(10) Patent No.: US 6,827,105 B1
(45) Date of Patent: Dec. 7, 2004

(54) VALVE

(75) Inventors: William R. Marble, Corbett, OR (US); Charles C. Kirkham, Corbett, OR (US)

(73) Assignee: Keamark, Inc., Corbett, OR (US)

( * ) Notice: Subject to any disclaimer, the term of this patent is extended or adjusted under 35 U.S.C. 154(b) by 29 days.

(21) Appl. No.: 10/232,933

(22) Filed: Aug. 30, 2002

Related U.S. Application Data

(60) Provisional application No. 60/317,276, filed on Sep. 4, 2001.

(51) Int. Cl.[7] ............................................. F16K 15/14
(52) U.S. Cl. .................. 137/854; 137/246; 137/512.15
(58) Field of Search ........................... 137/246, 512.15, 137/516.11, 516.13, 516.15, 516.17, 854; 220/89.1, 203.01, 203.11, 203.16, 203.29; 383/45, 100, 103; 206/524.8; 426/118

(56) References Cited

U.S. PATENT DOCUMENTS

| | | | | |
|---|---|---|---|---|
| 3,799,427 A | * | 3/1974 | Goglio ........................ 383/103 |
| RE30,327 E | * | 7/1980 | Damon ........................ 280/740 |
| 4,610,275 A | * | 9/1986 | Beecher ....................... 137/854 |
| 4,749,003 A | * | 6/1988 | Leason ......................... 137/854 |
| 4,886,372 A | * | 12/1989 | Greengrass et al. ......... 383/100 |
| 5,601,112 A | * | 2/1997 | Sekiya et al. ............ 137/512.15 |
| 5,992,442 A | * | 11/1999 | Urquhart et al. ............. 137/246 |
| 6,056,439 A | * | 5/2000 | Graham ....................... 383/103 |
| 6,129,116 A | * | 10/2000 | Laskowski ................... 137/854 |
| 6,283,147 B1 | * | 9/2001 | Rosseel ................. 137/512.15 |
| 6,516,829 B1 | * | 2/2003 | Townsend et al. ........... 137/517 |

* cited by examiner

*Primary Examiner*—Ramesh Krishnamurthy
(74) *Attorney, Agent, or Firm*—John Smith-Hill; Smith-Hill and Bedell

(57) ABSTRACT

A valve for controlling flow of fluid through an aperture in a barrier comprises a valve body including a pin and having a continuous sealing surface surrounding at least one opening through the valve body, and a diaphragm of resilient material. The diaphragm has an opening surrounded by an inner margin and is disposed with the pin extending through the opening and with a main surface presented towards the continuous sealing surface of the valve body. The inner margin of the diaphragm is in a state of tension around the pin of the valve body, whereby the diaphragm is prestressed to a condition in which the main surface of the diaphragm engages the sealing surface of the valve body.

14 Claims, 2 Drawing Sheets

VALVE

CROSS-REFERENCE TO RELATED APPLICATION

This application claims benefit of U.S. Provisional Application No. 60/317,276 filed Sep. 4, 2001, the entire disclosure of which is hereby incorporated by reference herein for all purposes.

BACKGROUND OF THE INVENTION

This invention relates to a valve and more particularly to a valve for controlling flow of fluid through an opening in an otherwise substantially fluid-tight barrier.

Granular dry materials, such as cat food and dried milk products, are frequently shipped in bags containing 10 pounds to 50 pounds of the dry material. The bags typically are made of, or have an interior lining of, a thermoplastic material such as polyethylene. The bags are filled and closed, e.g. by heat sealing, and are then palletized (placed in several layers to form a stack on a pallet) for transportation. Standard filling and sealing techniques do not allow removal of all the air from a bag that is filled with granular dry material during the filling and sealing operation. Accordingly, if the bag is made of fluid-tight material and is sealed in fluid-tight manner, a substantial quantity of air may be trapped inside the bag. This can cause a problem in palletizing the bags, because the bags that are lower in the stack on the pallet do not then support the bags that are higher in the stack in a firm and stable fashion. Consequently, it is common for a bag containing dry material to be perforated to allow air to escape when the bag is palletized even though it might appear to be fluid-tight. Although perforating the bag solves or mitigates the problem of air being trapped in the bag, this is not an ideal solution because it allows moisture and other contaminants to enter the bag, possibly causing spoilage of the contents.

It is known to package roasted coffee beans in a pouch provided with a valve that allows gas evolving from the coffee beans to escape from the pouch. A typical coffee valve is generally circular and includes a valve body, a cap and a diaphragm. The valve body has a generally flat valve seat or sealing surface that surrounds an opening and the diaphragm is positioned to lift from the sealing surface in the event that the pressure inside the coffee pouch exceeds the ambient pressure and to engage the sealing surface in the event that the ambient pressure exceeds the internal pressure in the coffee pouch.

In the conventional coffee valve, a film of silicone oil on the sealing surface fills gaps between the sealing surface and the diaphragm and thereby prevents leakage of air into the bag when the valve is closed. Surface tension of the silicone oil also tends to close the valve, and in fact when the valve opens under normal conditions, the diaphragm is forced away from the sealing surface over only a portion of the sealing surface and remains in contact with the sealing surface at other locations. Accordingly, when the pressure in the pouch drops sufficiently that flow of gas from the pouch stops, the surface tension of the silicone oil pulls the diaphragm back into contact with the sealing surface and restores the seal. The conventional coffee valve therefore provides an effective seal preventing entry of contaminants into the pouch, particularly when provided with silicone oil.

The rate at which gas evolves from roasted coffee beans is quite low and therefore the typical coffee valve need permit only a low flow rate to avoid excessive pressure build up in the pouch. However, the quantity of air trapped in a 50 pound bag of dog food may be such that it would take several hours for the air to escape through a standard coffee valve when the bag is placed at the bottom of a stack of similar bags on a pallet.

In addition, due to the nature of the process by which roasted coffee beans outgas, the rate at which gas evolves from the coffee beans does not undergo sudden changes, such that the pressure inside the pouch would increase rapidly unless the flow rate through the valve could increase rapidly. However, in the case of 10 to 50 pound bags of dry granular materials, when an upper bag is placed on top of a lower bag in a stack during palletizing, the pressure in the lower bag increases rapidly. If the lower bag were provided with a valve similar to the coffee valve but large enough to allow the air to escape in a few seconds or minutes, there is a high likelihood that the increase in pressure in the bag would displace the diaphragm from the sealing surface around its entire periphery, in which case the force of surface tension would no longer be available to pull the diaphragm back into contact with the sealing surface and closing of the valve could not be assured.

For the reasons set forth above, a valve based on the design and manner of operation of the conventional coffee valve is not suitable for venting a bag of granular dry material to prevent instability during palletizing.

SUMMARY OF THE INVENTION

In accordance with a first aspect of the present invention there is provided a valve for controlling flow of fluid through an aperture in a barrier, comprising a valve body including a pin and having a continuous sealing surface surrounding at least one opening through the valve body, and a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is in a state of tension around the pin of the valve body, whereby the diaphragm is prestressed to a condition in which the main surface of the diaphragm engages the sealing surface of the valve body.

In accordance with a second aspect of the present invention there is provided, in combination, a bag including a barrier of substantially fluid-tight material, said barrier being formed with an aperture, and a valve for controlling flow of fluid through said aperture, the valve comprising a valve body secured to the barrier, the valve body including a pin and having a continuous sealing surface surrounding at least one passage through the valve body, and a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is in a state of tension around the pin of the valve body, whereby the diaphragm is prestressed to a condition in which the main surface of the diaphragm engages the sealing surface of the valve body.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
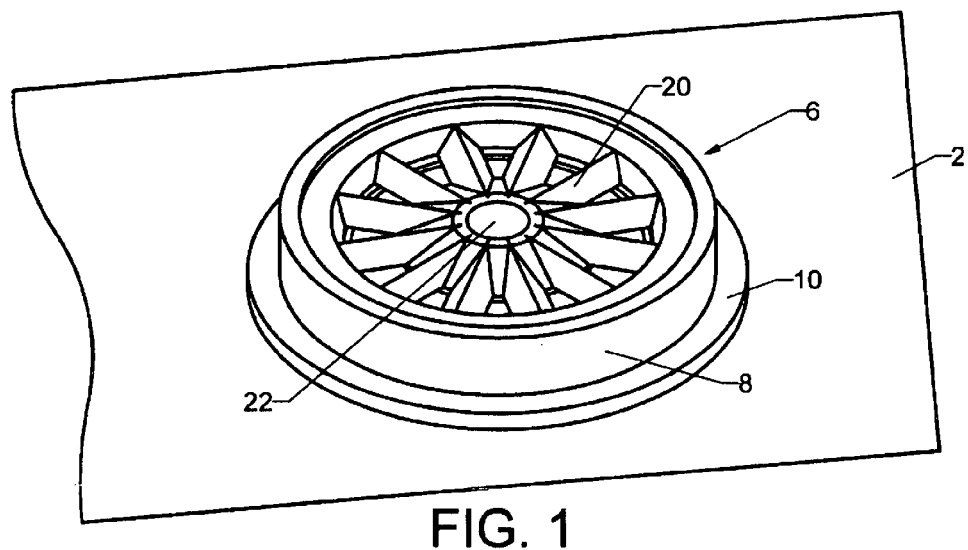
FIG. 1 is a perspective view of a first valve embodying the present invention.
Figure 2:
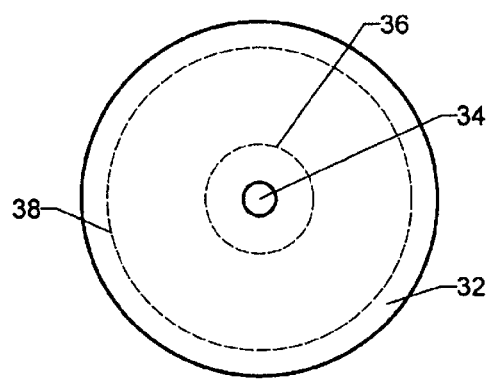
FIG. 2 is a plan view of a diaphragm that forms part of the first valve.
Figure 3:
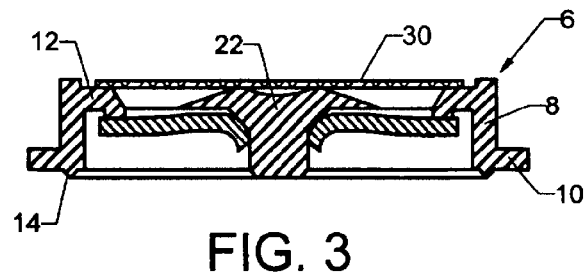
FIG. 3 is a sectional view of the first valve in the closed condition.
Figure 4:
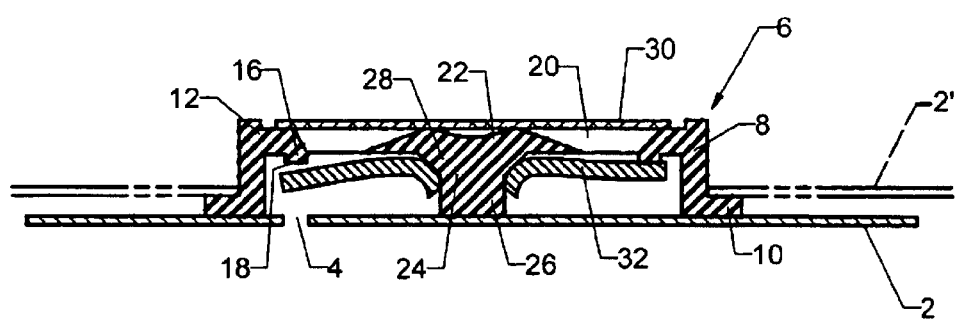
FIG. 4 is a sectional view of the first valve in a partially open condition.

FIGS. 1 and 3 illustrate partially a wall 2 of a bag containing granular dry material. The wall is formed with a hole 4 (FIG. 4). As shown in FIG. 3, the wall 2 is composed of a single layer, and in the case of FIGS. 1–3 this layer is a barrier layer of polyethylene. Alternatively the wall may comprise multiple layers of material, such as an outer envelope of paper and an inner barrier layer of polyethylene. In FIGS. 1 and 4, the wall 2 is oriented with its inner surface upward.

Referring to FIGS. 1–4, a first valve embodying the invention comprises a valve body 6 made of hard synthetic polymer material. The material of the valve body is preferably the same material as that of the barrier layer in order to facilitate heat sealing of the valve body to the barrier layer, as described below. The valve body 6 is formed by injection molding and has a generally cylindrical wall 8 provided with an external flange 10 and an internal flange 12. The external flange 10 is in contact with the inner surface of the wall 2 and has an annular ridge 14 on its underside to facilitate heat sealing of the valve body 6 to the polyethylene wall. The internal flange 12 has a downturned lip 16, the lower surface of which forms a sealing surface 18 of the valve body. A film of silicone oil is provided on the sealing surface 18. Radial support arms 20 extend inward from the internal flange 12 and support a center boss 22. The radial support arms 20 are angularly spaced from each other to define apertures passing through the valve body. The center boss 22 includes a pin 24, and it will be seen from FIG. 3 that the pin 24 includes a cylindrical portion 26 and that the pin flares outward from its cylindrical portion at a location that is below the sealing surface 18 to provide a frusto-conical portion 28.

The valve includes a filter disk 30 that seats against the internal flange 12. The filter disk 30 is inward of the sealing surface and protects the sealing surface from contamination by the contents of the bag. The material and pore size of the filter disk depend on the material in the bag.

An annular diaphragm 32 has a central opening 34 surrounded by an inner margin 36 and also has an outer margin 38. The diaphragm is made of a rubbery material that is selected so that it does not absorb silicone oil to a significant extent. A suitable material is that which is sold under the designation SANTOPRENE. When the diaphragm is in a relaxed state (FIG. 2), the central opening 34 in the diaphragm is substantially smaller in diameter than the cylindrical portion 26 of the pin 24.

The diaphragm 32 is installed in the valve by forcing the pin 24 through the central opening 34. This action places the inner margin 36 under tension so that the inner margin 36 seats against the pin 24 and curls upwards from the inner periphery of the diaphragm. Due to tension in the diaphragm, the diaphragm tends to assume the shape of a cone flaring upwards from the inner margin 36 and the outer margin 38 of the diaphragm is biased upward relative to the inner margin 36 and into contact with the sealing surface 18.

In order to install the valve, the valve body is positioned inside the bag so that the external flange 10 surrounds the hole 4 in the wall. The valve body is attached to the wall, for example by heat sealing. Heat sealing avoids the need to use adhesives, which pose a risk of contamination of the contents of the bag. FIG. 4 also shows an alternative mode of installation, in which the valve is installed from outside the bag. In this case, the wall 2' of the bag (shown in phantom in FIG. 4) is formed with an opening that is large enough to accept the cylindrical wall 8 of the valve body and the valve body is pushed through the opening to position the upper surface of the external flange against the exterior of the wall 2'. The external flange is attached to the wall, for example by heat sealing. A cap or filter (not shown) is secured to the external flange to protect the diaphragm.

FIG. 3 shows the configuration of the diaphragm when the valve is closed, which occurs when the gauge pressure inside the bag is below about 0.125 psi, i.e. the pressure inside the bag is no higher than 0.125 psi above the ambient atmospheric pressure.

When the gauge pressure inside the bag is zero, pre-stress of the diaphragm keeps the diaphragm in contact with the sealing surface 18. When the gauge pressure inside the bag increases above about 0.125 psi, the force acting on the diaphragm due to the pressure difference overcomes the pre-stress and forces the diaphragm away from the sealing surface 18. A portion of the diaphragm that flares outward of the frusto-conical portion 28 of the pin 24 pivots about the point of contact of the diaphragm with the pin and lifts away from the sealing surface 18. FIG. 4 shows the configuration of the diaphragm when the gauge pressure inside the bag is at least about 0.125 psi and the diaphragm has lifted away from the sealing surface 18 at the left side of the valve. In this condition, air is able to escape from the bag and the pressure inside the bag falls. The added distortion of the diaphragm generates a force resisting further distortion and tending to close the valve. When the pressure within the bag is almost atmospheric, the valve closes and prevents ingress of contaminants into the bag. It is desirable that the valve should provide an effective seal at zero pressure difference, since otherwise contaminants could enter the bag when the pressure inside the bag is equal to the ambient pressure.

It will be understood that if a bag of granular dry material is provided with a valve of the kind described with reference to FIGS. 1–4 and is placed on a pallet to form part of a layer of bags on the pallet, when another bag is placed on top of the first bag, the valve opens immediately and allows rapid venting of air from the bag. Also, if the ambient atmosperic pressure should change, for example in the event that the bag were being transported by truck over a mountain pass, the valve would open and allow venting of the bag, eliminating the danger of bursting, and would subsequently close and seal the bag against entry of contaminants.

In the event of a sudden increase in pressure inside the bag, the valve diaphragm may separate from the sealing surface around the entire periphery of the sealing surface and the restoring force generated by deflection of the diaphragm causes the valve to close when the pressure inside the bag falls to within about 0.125 psi of atmospheric. Accordingly, closing of the valve does not rely on surface tension in the silicone oil.

In an embodiment of the invention, the diaphragm has an external diameter of about 0.75 inch, an internal diameter of about 0.067 inch, a thickness in the range from about 0.026 to about 0.032 inch and a shore A durometer of 45–55. The diameter of the pin in this case is about 0.125 inch, or approximately twice the diameter of the hole in the diaphragm.

The location of the pivot point influences the pressure difference at which the valve opens. The flaring of the center pin above the cylindrical portion 26 increases the radial extent of the inner margin 36 over which the diaphragm is stressed when it is installed on the center pin and thus moves radially outward the location about which the outer margin of the diaphragm pivots for opening the valve.

A valve embodying the invention may be used in several different circumstances. The valve may be used to allow gas to escape from the bag to the ambient atmosphere, as described above, in which case the final pressure in the bag is equal to the minimum atmospheric pressure plus the pressure difference required to open the valve. Since ambient pressure varies, at any given time the pressure inside the bag might be below the current ambient atmospheric pressure. In a second mode of operation, the valve is used to allow a partial vacuum to be established in the bag. In this case, the valve is connected to the suction side of a vacuum pump for exhausting air from the bag and reducing the pressure in the bag to below atmospheric. When the connection to the vacuum pump is removed, the valve closes and the pressure inside the bag remains below atmospheric, subject to leakage. In a third mode of operation, the valve is attached to the exterior of the bag and is used to pressurize the bag. The valve is connected to a source of gas under pressure and allows the gas to enter the bag to increase the pressure above atmospheric. When the source of gas under pressure is removed, the valve closes and the pressure inside the bag remains above atmospheric, subject to leakage.

It will be appreciated that the invention is not restricted to the particular embodiments that have been described and illustrated, and that variations may be made therein without departing from the scope of the invention as defined in the appended claims and equivalents thereof. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated.

What is claimed is:

1. A valve for controlling flow of fluid through an aperture in a barrier, comprising:
   a valve body including a pin and having a continuous sealing surface surrounding at least one opening through the valve body, wherein said pin has an outer portion and an inner portion, said inner portion being of greater cross-sectional area than the outer portion, and
   a diaphragm of resilient material, the diaphragm having a main surface and an opening surrounded by an inner margin, the diaphragm being disposed with the pin extending through said opening and with the main surface presented towards said sealing surface,
   and wherein the inner margin of the diaphragm is seated against the outer and inner portions of the pin of the valve body and is in a state of tension around said pin, whereby the diaphragm is prestressed to a condition in which the main surface of the diaphragm engages the sealing surface of the valve body, the outer portion of the pin is cylindrical, the continuous sealing surface is substantially annular and the diaphragm is substantially annular having an inner periphery that is smaller, when the diaphragm is in a relaxed condition, than the diameter of the outer portion of the pin, and the diameter of the inner periphery of the diaphragm, in said relaxed condition, is about half the diameter of the outer portion of the pin.

2. A valve for controlling flow of fluid through an aperture in a barrier, comprising:
   a valve body including a pin and having a continuous sealing surface surrounding at least one opening through the valve body, wherein said pin has an outer portion and an inner portion, said inner portion being of greater cross-sectional area than the outer portion, and
   a diaphragm of resilient material, the diaphragm having a main surface and an opening surrounded by an inner margin, the diaphragm being disposed with the pin extending through said opening and with the main surface presented towards said sealing surface,
   and wherein the inner margin of the diaphragm is seated against the outer and inner portions of the pin of the valve body and is in a state of tension around said pin, whereby the diaphragm is prestressed to a condition in which the main surface of the diaphragm engages the sealing surface of the valve body, the outer portion of the pin is cylindrical, the continuous sealing surface is substantially annular and the diaphragm is substantially annular having an inner periphery that is smaller, when the diaphragm is in a relaxed condition, than the diameter of the outer portion of the pin, the inner portion of the pin is of a substantially frusto-conical shape, flaring outward from the outer portion.

3. A valve for controlling flow of fluid through an aperture in a barrier, comprising:
   a valve body including a pin and having a continuous sealing surface surrounding at least one opening through the valve body, wherein said pin has an outer portion and an inner portion, said inner portion being of greater cross-sectional area than the outer portion, and
   a diaphragm of resilient material, the diaphragm having a main surface and an opening surrounded by an inner margin, the diaphragm being disposed with the pin extending through said opening and with the main surface presented towards said sealing surface,
   and wherein the inner margin of the diaphragm is seated against the outer and inner portions of the pin of the valve body and is in a state of tension around said pin, whereby the diaphragm is prestressed to a condition in which the main surface of the diaphragm engages the sealing surface of the valve body, the valve body includes a generally annular wall having first and second opposite axial ends, the wall has a surface at said first axial end for engaging the barrier and has an internal flange at said second axial end, the internal flange has a lip that projects towards said first axial end, the valve body also includes an apertured web that attaches the pin to the internal flange, and the pin extends from the apertured web towards said first axial end of the wall.

4. A valve according to claim 3, wherein the diaphragm is positioned on the pin with the inner margin of the diaphragm extending towards said first axial end of the wall.

5. A valve according to claim 3, wherein the apertured web comprises ribs extending radially inward from the wall towards a center boss which is adjacently and coaxially located to the inner portion of the pin.

6. In combination, a bag including a barrier of substantially fluid-tight material, said barrier being formed with an aperture, and a valve for controlling flow of fluid through said aperture, the valve comprising:
   a valve body secured to the barrier, the valve body including a pin and having a continuous sealing surface surrounding at least one passage through the valve body, and
   a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is in a state of tension around the pin of the valve body, whereby the diaphragm is prestressed to a condition in which the main surface of the diaphragm engages the sealing surface of the valve body, the valve body includes a generally annular wall having first and second opposite axial ends, the wall has a surface at said first axial end sealed to the barrier and has an internal flange at said second axial end, the internal flange has a lip that projects towards said first axial end, the valve body also includes ribs that attach the pin to the internal flange, and the pin extends from the ribs towards said first axial end of the wall.

7. A valve for controlling flow of fluid through an aperture in a barrier, comprising:

a valve body including a pin and having a continuous sealing surface surrounding at least one opening through the valve body, and a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is in a state of tension around the pin of the valve body, whereby the diaphragm is prestressed to a condition in which the main surface of the diaphragm engages the sealing surface of the valve body, the valve body includes a generally annular wall having first and second opposite axial ends, the wall has a surface at said first axial end for engaging the barrier and has an internal flange at said second axial end, the internal flange has a lip that projects towards said first axial end, the valve body also includes an apertured web that attaches the pin to the internal flange, and the pin extends from the apertured web towards said first axial end of the wall.

8. A valve according to claim 7, wherein the continuous sealing surface is substantially annular, the pin has a substantially cylindrical portion and the diaphragm is substantially annular having an inner periphery that is smaller, when the diaphragm is in a relaxed condition, than the diameter of the cylindrical portion of the pin.

9. A valve according to claim 8, wherein the diameter of the inner periphery of the diaphragm, in said relaxed condition, is about half the diameter of the cylindrical portion of the pin.

10. A valve according to claim 8, wherein the pin has a substantially frusto-conical portion flaring outward from the cylindrical portion and the inner margin is seated against the cylindrical portion of the pin and the frusto-conical portion of the pin.

11. A valve according to claim 7, wherein the diaphragm is positioned on the center pin with the inner margin of the diaphragm in contact with the center pin, and the inner margin extends towards said first axial end of the wall.

12. A valve according to claim 7, comprising a film of a sealing liquid on the sealing surface of the valve body.

13. In combination, a bag including a barrier of substantially fluid-tight material, said barrier being formed with an aperture, and a valve for controlling flow of fluid through said aperture, comprising:

a valve body including a pin and having a continuous sealing surface surrounding at least one opening through the valve body, wherein said pin has a outer portion and an inner portion, said inner portion being of greater cross-sectional area than the outer portion, and a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is seated against the outer and inner portions of the pin of the valve body and is in a state of tension around said pin, whereby the diaphragm is prestressed to a condition in which the main surface of the diaphragm engages the sealing surface of the valve body, the valve body includes a generally annular wall having first and second opposite axial ends, the wall has a surface at said first axial end sealed to the barrier and has an internal flange at said second axial end, the internal flange has a lip that projects towards said first axial end, the valve body also includes ribs that attach the pin to the internal flange, and the pin extends from the ribs towards said first axial end of the wall.

14. In combination, a bag including a barrier of substantially fluid-tight material, said barrier being formed with an aperture, and a valve for controlling flow of fluid through said aperture, comprising:

a valve body including a pin and having a continuous sealing surface surrounding at least one opening through the valve body, and a diaphragm of resilient material, the diaphragm having a main surface and an opening surrounded by an inner margin, the diaphragm being disposed with the pin extending through said opening and with the main surface presented towards said sealing surface, and wherein the inner margin of the diaphragm is in a state of tension around the pin of the valve body, whereby the diaphragm is prestressed to a condition in which the main surface of the diaphragm engages the sealing surface of the valve body, the valve body includes a generally annular wall having first and second opposite axial ends, the wall has a surface at said first axial end for engaging the barrier and has an internal flange at said second axial end, the internal flange has a lip that projects towards said first axial end, the valve body also includes an apertured web that attaches the pin to the internal flange, and the pin extends from the apertured web towards said first axial end of the wall.

* * * * *